(12) United States Patent
Proebstle et al.

(10) Patent No.: US 9,333,866 B2
(45) Date of Patent: May 10, 2016

(54) CHARGING DEVICE AND CHARGING METHOD WITH FLOAT-MOUNTED CHARGING UNIT

(71) Applicant: Bayerische Motoren Werke Aktiengesellschaft, Munich (DE)

(72) Inventors: Hartmut Proebstle, Wuerzburg (DE); Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 217 days.

(21) Appl. No.: 14/100,776

(22) Filed: Dec. 9, 2013

(65) Prior Publication Data

US 2014/0091757 A1   Apr. 3, 2014

Related U.S. Application Data

(63) Continuation of application No. PCT/EP2012/060736, filed on Jun. 6, 2012.

(30) Foreign Application Priority Data

Jun. 10, 2011   (DE) .......................... 10 2011 077 427

(51) Int. Cl.
*H02J 7/00*   (2006.01)
*B60L 11/18*   (2006.01)

(52) U.S. Cl.
CPC .......... *B60L 11/1812* (2013.01); *B60L 11/182* (2013.01); *B60L 11/1824* (2013.01); *B60L 11/1831* (2013.01); *B60L 11/1846* (2013.01);

(Continued)

(58) Field of Classification Search
CPC ........ H02J 7/025; H01F 38/14; Y02T 90/122; B60L 11/182; Y02E 60/12
USPC ........................................................ 320/108
See application file for complete search history.

(56) References Cited

U.S. PATENT DOCUMENTS 5,617,003 A   4/1997  Odachi et al.
5,654,621 A   8/1997  Seelig (Continued)

FOREIGN PATENT DOCUMENTS

DE           42 36 286 A1   5/1994
DE    10 2007 036 228 A1   2/2009

(Continued)

OTHER PUBLICATIONS

International Preliminary Report on Patentability (PCT/IB/373), including Written Opinion (PCT/ISA/237) dated Dec. 10, 2013 (Five (5) pages).

(Continued)

*Primary Examiner* — Arun Williams
(74) *Attorney, Agent, or Firm* — Crowell & Moring LLP

(57) ABSTRACT

A charging arrangement includes a vehicle having a charging module in the vehicle underbody, and a stationary charging station with a charging unit, for the inductive charging of a battery of the vehicle. The charging station is disposed close to the ground or in the ground. The charging unit is floatingly disposed in the charging station, within a predefined horizontal movement area. The charging module has at least one localization magnet and the charging unit has at least one positioning magnet. The charging unit is constructed as a primary coil, and the charging module is constructed as a secondary coil.

10 Claims, 2 Drawing Sheets

(52) U.S. Cl.
CPC ............ *Y02T 10/7005* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 5,821,731 | A * | 10/1998 | Kuki | B60L 11/1805 320/108 |
| 5,909,100 | A | 6/1999 | Watanabe et al. | |
| 2010/0235006 | A1 | 9/2010 | Brown | |
| 2010/0315038 | A1 * | 12/2010 | Terao | H01F 38/14 320/108 |
| 2011/0084658 | A1 * | 4/2011 | Yamamoto | B60L 5/005 320/108 |
| 2011/0095618 | A1 * | 4/2011 | Schatz | H03H 7/40 307/104 |
| 2011/0148350 | A1 * | 6/2011 | Wegener | B60L 11/182 320/108 |
| 2011/0172837 | A1 * | 7/2011 | Forbes, Jr. | G06Q 10/00 700/291 |
| 2011/0187317 | A1 * | 8/2011 | Mitake | B60L 5/005 320/108 |
| 2011/0285349 | A1 * | 11/2011 | Widmer | B60L 11/182 320/108 |

FOREIGN PATENT DOCUMENTS

| | | |
|---|---|---|
| DE | 10 2009 023 409 A1 | 12/2010 |
| EP | 0 788 212 A2 | 8/1997 |
| EP | 1 061 631 A1 | 12/2000 |
| GB | 2 340 318 A | 2/2000 |
| GB | 2 471 879 A | 1/2011 |

OTHER PUBLICATIONS

Corresponding International Search Report with English Translation dated Dec. 5, 2012 (eight (8) pages).
German Search Report with English Translation dated Apr. 5, 2012 (ten (10) pages).

* cited by examiner

CHARGING DEVICE AND CHARGING METHOD WITH FLOAT-MOUNTED CHARGING UNIT

CROSS REFERENCE TO RELATED APPLICATIONS

This application is a continuation of PCT International Application No. PCT/EP2012/060736, filed Jun. 6, 2012, which claims priority under 35 U.S.C. §119 from German Patent Application No. 10 2011 077 427.0, filed Jun. 10, 2011, the entire disclosures of which are herein expressly incorporated by reference.

BACKGROUND AND SUMMARY OF THE INVENTION

The invention relates to a charging arrangement and a charging method having a floating charging unit, the charging arrangement comprising a vehicle having a charging module in the vehicle underbody and a stationary charging station having a charging unit, in order to inductively charge a battery of the vehicle.

Within the next decade, vehicles having an electric drive, such as electric and hybrid vehicles, will increase their market shares in the automobile sector. These vehicles frequently have an external recharging possibility which is usually implemented in a wired manner. Such vehicles are therefore also called plug-in vehicles. The charging of a plug-in vehicle has to be based on a robust and lasting concept suitable for everyday driving, in order to be able to achieve a comprehensive production readiness. It is therefore a goal to facilitate an efficient comfortable charging within the scope of the public infrastructure (roads and expressways) and of the private infrastructure (parking spaces and garages). Up to now, the development has preferably been based on wired charging stations.

Increasingly, wireless charging stations with a contactless energy transmission are also being considered. This inductive charging technique is known in the state of the art. German Patent Document DE 42 36 286 A1 describes, for example, an arrangement with a vehicle-side secondary charging coil and a primary charging coil of the charging station which is guided to the vehicle on a guiding arm for charging the vehicle. Since, for establishing an optimal charging connection, the guiding arm is moved in a sensor-controlled motor-driven manner between the two coils, this is a complex and cost-intensive development. German Patent Document DE 10 2009 023 409 A1, for example, describes a vehicle docking system, where the vehicle movement is utilized for bringing a secondary charging coil at the vehicle in contact with a primary charging coil at a charging station. This makes it necessary for the driver to move the vehicle in a targeted manner, i.e. possibly with much maneuvering, into a precisely predefined target position.

It is an object of the invention to provide an improved charging arrangement and an improved charging method.

This and other objects are achieved by a charging arrangement and a charging method with a floating charging unit. The arrangement includes a vehicle having a charging module in the vehicle underbody and a stationary charging station with a charging unit, for the inductive charging of a battery of the vehicle.

According to the invention, the charging station is disposed close to the ground or in the ground. Furthermore, the charging unit is disposed in the charging station in a floating manner and has a predefined horizontal movement range. In addition, the charging module has at least one localization magnet, and the charging unit has at least one positioning magnet. The charging unit is constructed as a primary coil, and the charging module is constructed as a secondary coil.

This has the effect that, although the charging station may be disposed in a stationary manner, the charging unit carrying the primary coil is disposed to be movable in the horizontal direction, i.e. in the x-direction (longitudinal axis) and y-direction (transverse axis) of a vehicle-related coordinate system, and is not tied to any location within the horizontal movement range. The ground is particularly that plane or the area below this plane on which the wheels of the vehicles are rolling. Within the scope of this document, the terms ground and underground are synonymous.

According to a preferred embodiment of the present invention, the charging station is filled at least partially with a viscous non-conductive and non-magnetic medium of a first density. The charging unit has floating bodies or hollow bodies of a second density which is lower than the first density.

The floating bodies or the hollow bodies ensure that the charging unit essentially floats on the liquid medium. The buoyancy force of the charging unit required for this purpose is the result of a partial immersion of the charging unit in the liquid medium.

Preferably, the at least one, particularly every localization magnet, and the at least one, particularly every positioning magnet, are designed as continuous field magnets. As a result of the arrangement of the at least one localization magnet and of the at least one positioning magnet, the magnetic field orientation of the at least one localization magnet and the magnetic field orientation of the at least one positioning magnet result in an attractive positioning force between the at least one localization magnet and the at least one positioning magnet. By means of the positioning force, a horizontal movement of the charging unit is induced. In a position of the charging unit, which is called a charging position, the potential energy of the positioning magnets in the magnetic field of the localization magnets is locally minimal with respect to the horizontal movement range.

This means, in other words, that the positioning magnets are attracted by the localization magnets. When the charging module is situated in the range of the charging station, the charging unit with the primary coil and the positioning magnets is attracted by the charging module with the secondary coil and the localization magnets. In this case, the charging unit reaches a local minimum of potential energy with respect to its mobility in the x-direction and y-direction in the horizontal movement range, the location of the local minimum being determined by the position of the charging module. Although, if the charging module is not situated in the range of the horizontal movement area, there may be an interaction of the magnetic fields of the localization and positioning magnets, a local minimum of potential energy cannot be taken up by the charging unit in this case. The charging module will therefore then be situated in the range of the horizontal movement area if the charging module takes up position coordinates in the vehicle-fixed coordinate system with respect to the x-axis and y-axis, which position coordinates can be taken up by the mobile charging unit in the same reference system. In other words, in this coordinate system, the charging module will then be situated with respect to the x-axis and y-axis in the horizontal movement range of the charging unit.

If the localization and positioning magnets are electromagnets, according to a special embodiment, the magnets can be energized only if the charging module is moving in this horizontal coordinate range.

According to a further embodiment, the charging station is integrated in the body of the road or the parking space underground. This permits an inconspicuous and space-saving accommodation of the charging station, for example, on public parking lots or in a private garage.

The charging arrangement preferably has a restoring spring between the charging station and the charging unit. The restoring spring exercises a spring force upon the charging unit in the direction of the center of the horizontal movement area. If the charging module is situated in the horizontal movement range of the charging unit, the spring force will be lower than the positioning force.

As a result, it is ensured that the restoring spring positions the charging unit in the horizontal center of the movement area if no vehicle with a charging module is within the range of the charging station. This position is used as the starting position of the charging unit if a charging module of a vehicle to be charged is moved into the range of the charging station.

By means of the described charging arrangement, a charging method can be implemented by which the vehicle first takes up a stopping position in which the charging module is situated in the movement range. In the stopping position, the floating charging unit is attracted by the charging module and the charging position is reached. A battery charging operation will be started when the stopping position (or the charging position) has been reached. This means that the primary coil is fed by an external a.c. network in order to build up a magnetic alternating field. The inductive energy transfer between the primary coil and the secondary coil, in the charging position, is locally maximal with respect to the horizontal movement range.

This charging method offers the vehicle driver the advantage that, for charging the battery, the vehicle is positioned sufficiently precisely above the charging station when the charging module is situated only in the horizontal movement range of the charging unit. The floating charging unit will then automatically be moved into the charging position and is held in the charging position for the charging. In the charging position, the energy transfer between the primary coil and the secondary coil will be maximal. In other words, this means that, if the charging unit is situated in the x-direction and/or y-direction at a distance from the charging position, the energy transfer between the coils will be lower than in the charging position. The charging position therefore forms a local maximum of the transferable electric power.

In a further embodiment of the invention, information can be exchanged between the charging station and the charging module. The exchangeable information contains location data of the vehicle as well as status information of the battery and control variables for a battery charging operation.

The information can be utilized, for example, for assisting the driver when taking up a stopping position by means of navigation instructions. The communication between the vehicle and the charging station can also be used for identifying the vehicle, for example, in order to carry out an automatic billing of the charging operation with the car owner. Such a billing procedure can also be carried out driver-specifically by the identification of a certain vehicle key.

According to a defined further development, the charging station is movable in the vertical direction relative to the vehicle underbody.

Therefore, when the charging position has been reached by the charging unit, the spatial distance can be minimized between the two coils in the vertical direction, i.e. in the direction of the vertical axis of the vehicle, in order to increase the energy transfer from the primary coil to the secondary coil.

The invention is based on the considerations indicated in the following.

Wired charging stations for electric vehicles or plug-in vehicles are inconvenient and can be insufficiently implemented in the public infrastructure. Wireless inductive charging methods so far have had insufficient concepts for an efficient energy transfer and vehicle coupling. The two points require a close linking of the "filling station", i.e. of the primary carrier side, to the vehicle because of the line loss. In addition, because of the integration into the public infrastructure, such as the road pavement or the underground garage floor, the implementation has to be weather-resistant and compensate a certain "unsharpness" or certain positions of the vehicle to be filled, and thereby minimize charging losses, i.e. "automatically" establish an ideal contact between the charging station and the vehicle.

As an improvement measure, a weather-resistant charging station is to be introduced which contains a charging unit hermetically closed off from the environment. Here, a weather-resistant cast housing made, for example, of PE or PTFE is used, which completely integrates the charging unit. The charging station can be integrated into the public infrastructure (for example, a road pavement) as well as into the private infrastructure (for example, a garage).

In addition, the weather-resistant integrated charging station has a "self-optimizing" positioning of the charging unit relative to the vehicle in order to minimize charging losses and permit arbitrary positions of the charging vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Identical reference symbols mark the same technical object.

Figure 1:
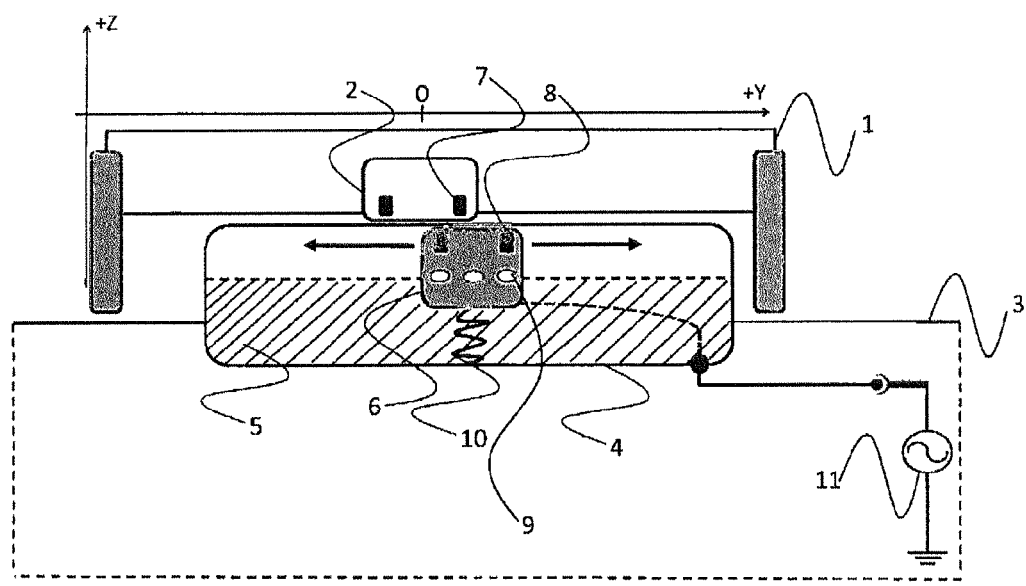
FIG. 1 is a schematic view of a charging arrangement with a floating unit, viewed in the direction of the longitudinal axis of the vehicle.
Figure 2:
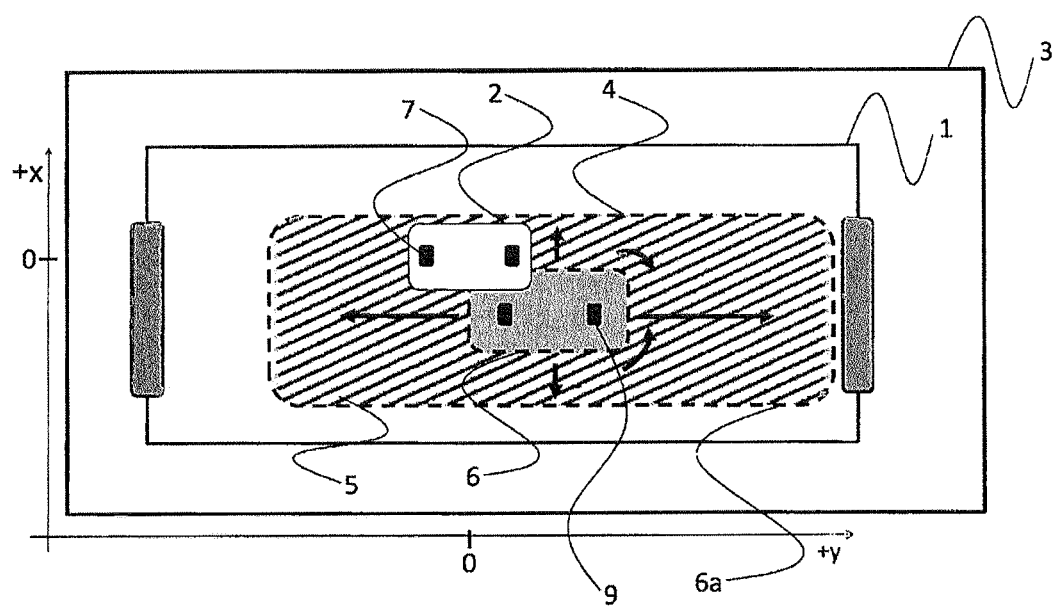
FIG. 2 is a schematic view of a charging arrangement with a floating unit, viewed in the direction of the vertical axis of the vehicle (from above).

FIG. 1 and FIG. 2 schematically illustrate a front end or rear end 1 of an electric or hybrid vehicle. A charging module 2 is situated at the vehicle underbody. The charging module 2, which particularly comprises a secondary coil for the inductive charging of the vehicle from an external primary coil, has a defined "vehicle-fixed" mounted position. When the vehicle is stopped or parked, the zero point of the x-axis (longitudinal axis) and the zero point of the y-axis (transverse axis) are to be given by the charging module in the vehicle-related coordinate system known to a person skilled in the art.

The charging module also has at least one continuous-field magnet 7, which is called a localization magnet. Without limiting the generality, two localization magnets are shown as being used herein. These may be permanent magnets or electromagnets.

The stationary inductive charging station 4 is integrated in the underground of the stopping place of the vehicle 3. The stopping place may, for example, be a public charging station at parking lots, rest areas, turn-out areas, etc. or a charging station installed in the private sector, for example, in a domestic garage. The charging station is fixed on the underground and, in the case of a height of the charging station in the z-direction (vertical axis of the vehicle) which exceeds the ground clearance of common electric and hybrid vehicles, is at least partially sunk into the supporting or cover layers and/or into the foundation of the body of the road or of the stopping place.

The charging station is essentially formed by a receptacle filled with a liquid medium 5. This may, for example, be a viscous non-magnetic and electrically non-conductive oil. The charging unit 6 of the inductive charging station is disposed in a floating manner, i.e. movably in the x-direction and the y-direction, in the receptacle and on the liquid medium. The freedom of motion is limited by the receptacle in the x-direction and y-direction and is called a horizontal movement area 6a. With respect to the transverse axis, the charging station has a length of ideally 30%-80% of the vehicle width. Smaller charging stations are also conceivable, but the mobility of the charging unit would be limited and the vehicle would have to be placed the more precisely for the charging. Particularly in the case of stations completely sunk into the ground, the width of the station may also exceed the width of the vehicle. The charging unit 6 is equipped with the primary coil for the inductive energy transfer technique known to a person skilled in the art. The floating support can also be implemented by hollow spaces 9 integrated in the primary coil or floating and/or air bodies accommodated in the unit, so that the density of the liquid medium 5 exceeds the density of the charging unit 6. The charging unit 6 is fed by alternating current, preferably by way of the public or domestic alternating-current network 11.

In addition, the charging unit has at least one continuous-field magnet 8, which is further developed as a permanent or electromagnet and is called a positioning magnet. Furthermore, without limiting the generality, two positioning magnets are shown as being used herein.

In order to charge the electric or hybrid vehicle, the vehicle is placed in the area of the stopping place having the charging station in such a manner that the area of the vehicle having the charging module is situated above the receptacle of the charging station in the z-direction. Such a stopping position is schematically illustrated in the top view of FIG. 2. In this case, the vehicle user can be assisted by constructional positioning aids, such as markings, wheel stops or lateral guard rails in the ground covering. The driver may also be guided electronically, as, for example, by the navigation system or by acoustic or visual signals, as known, for example, from parking assist systems. In this case, a data communication can also be used between the vehicle and the charging station for determining the position. In each case, in order to initiate a battery charging operation, the driver only has to relatively roughly position the vehicle with respect to the charging station, the position being determined by the horizontal movement area. The establishing of the stopping position of the vehicle requires no maneuvering movements whatsoever and does not reduce the driver's comfort. When taking-up the stopping position, the position of the charging module 2 with respect to the x-axis and the y-axis may possibly deviate from the position of the charging unit 6 with respect to the x-axis and the y-axis in the same vehicle-fixed coordinate system. However, in the stopping position, the (x,y)-location coordinates of the charging module are situated in the (x,y)-coordinate range that is formed in the same reference system by the horizontal movement area of the charging unit; see FIG. 2.

The field intensities of the localization and positioning magnets and the viscosity of the liquid medium are dimensioned such that, if the vehicle takes up a stopping position as described above, the magnetic fields of the localization magnets start to interact with the magnetic fields of the positioning magnets such that the orientations of the magnetic fields result in an attractive force. This force leads to a movement of the charging unit 6 in order to take up the position with the minimum of potential energy of the positioning magnets with respect to the localization magnets. This position is called a charging position. In order to take up this position, a combined movement in the x-direction and the y-direction may occur as well as a rotating movement of the charging unit about the z-axis.

A high energy transfer with a loss of energy that is as low as possible takes place while the magnetic flux of the primary coil penetrating the secondary coil is as high as possible. With respect to the x-direction and the y-direction, this is ensured in the charging position by the position of the localization magnets relative to the secondary coil and of the positioning magnets relative to the primary coil. It should be noted that the taking-up of the optimal charging position by the charging unit is possible when the charge is activated, i.e. when the primary coil with the high-frequency alternating magnetic field is operative, as well as when the primary coil is inoperative. When the alternating field is activated, on average with respect to time, this has no effect on the interaction of the continuous fields of the localization magnets and the positioning magnets.

With respect to the z-axis, the energy transfer is the more efficient, the smaller the distance between the primary coil and the secondary coil in the optimal charging position. This distance is determined by the ground clearance of the vehicle, the installation depth of the charging station in the underground and the filling level of the liquid medium in the receptacle. The distance can be minimized by a filling level of the receptacle with liquid medium that is as high as possible in the positive z-direction and by a distance of the vehicle underbody from the charging station that is a short as possible when the stopping position is taken up. For this purpose, the charging station and/or its integration in the underground can be designed, for example, for a special vehicle type. As an alternative, the vehicle construction can also be adapted to the stopping place having the charging station.

According to a further embodiment, the charging station can be lifted and lowered relative to the vehicle or the vehicle can be lifted and lowered with respect to the charging station in order to minimize the distance between the two coils in the optimal charging position. This can, for example, be achieved by means of a lifting or lowering platform also integrated in the stopping place, for the charging station or the vehicle.

During the charging, the charging unit remains in the optimal charging position because, as described above, this position forms a local energetic minimum.

After a charging operation has taken place and/or after the removal of the vehicle from the stopping position, the charging unit takes up a predefined starting position in the receptacle, which can be established, for example, by way of an integrated restoring spring 10 fastened in a centered manner to the charging station and charging unit; see FIG. 1. The spring force of the restoring force is to be designed to be so low with respect to the minimally attracting force of the localization and positioning magnet when a vehicle is in a stopping position, that the movement of the charging unit is not suppressed.

According to a further development of the charging arrangement, a charging operation may only be cleared when the stopping position has been reached. A communication connection can be used for this purpose, which has one communication unit at the vehicle and one communication unit at the charging station from the vehicle to the charging station or to the network operator, which may also be combined with a vehicle identification and/or an above-described position detection of the vehicle. Business management models for an automated billing of the charging operation with the current supplier can also be derived therefrom, if the vehicle identification also includes a driver or vehicle owner identification, for example, by way of the identification of a certain vehicle key assigned to a natural person or legal entity.

The described charging arrangement and the described charging method have considerable advantages, particularly for the vehicle driver. As a result of the self-optimizing concept that is based on magnetic fields, while eliminating externally movable parts, the charging station can have a very simple and robust exterior design. Such a charging station fixedly installed on the underground promises, in addition to the easy operability, also a long service life. For open air use, the charging arrangement provides weathering resistance because all electrical components of the charging station can be accommodated in the receptacle or can be laid in the underground. This applies, for example, to the linkage to the external alternating-current network or the communication unit.

LIST OF REFERENCE SYMBOLS

1 Vehicle front end or rear end
2 Charging module
3 Parking space underground
4 Charging station
5 Liquid medium
6 Charging unit
6a Horizontal movement area
7 Localization magnet
8 Positioning magnet
9 Hollow spaces or floating bodies
10 Restoring spring
11 Alternating current network
x Longitudinal axis
y Transverse axis
z Vertical axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging arrangement, comprising:
a vehicle having a charging module in an underbody of the vehicle;
a stationary charging station having a charging unit, the charging unit and charging module being configured for an inductive charging of a battery of the vehicle, wherein
the charging station is disposed close to or in a ground surface,
the charging unit is floatingly disposed in the charging station, wherein the charging unit has a predefined horizontal movement area,
the charging module has at least one localization magnet and the charging unit has at least one positioning magnet,
the charging unit comprises a primary coil, and the charging module comprises a secondary coil, wherein
the charging station is at least partially filled with a viscous non-conductive and non-magnetic medium of a first density, and
the charging unit comprises floating bodies and/or hollow bodies of a second density, the first density being greater than the second density.

2. The charging arrangement according to claim 1, wherein
the at least one localization magnet is a continuous-field magnet,
the at least one positioning magnet is a continuous-field magnet,
the at least one localization magnet and the at least one positioning magnet are arranged such that a magnetic field orientation of the at least one localization magnet and a magnetic field orientation of the at least one positioning magnet provide an attractive positioning force between the at least one localization magnet and the at least one positioning magnet, and
the attractive positioning force is designed to cause a horizontal movement of the charging unit, and
with respect to the horizontal movement area, in a charging position a potential energy of the positioning magnet in the magnetic field of the localization magnet is locally minimal.

3. The charging arrangement according to claim 2, wherein
the charging station includes a restoring spring arranged between the charging unit and a housing of the charging station,
the restoring spring exercises a spring force upon the charging unit in a direction of a center of the horizontal movement area, and
the spring force is lower than the attractive positioning force that occurs when the charging module is situated in the horizontal movement area of the charging unit.

4. The charging arrangement according to claim 1, wherein the charging station is integrated in a road or a parking space ground.

5. The charging arrangement according to claim 1, wherein information is exchangeable between the charging station and the charging module, said information comprising location data of the vehicle and status information of the battery of the vehicle, as well as control variables for carrying out a charging operation of the battery of the vehicle.

6. The charging arrangement according to claim 1, wherein the charging station is movable in a vertical direction relative to the underbody of the vehicle.

7. A charging station for a vehicle equipped with a charging module in an underbody of the vehicle, the charging module comprising a secondary coil and having a localization magnet, the charging station comprising:
a housing;
a charging unit comprising a primary coil and a positioning magnet, the charging unit being floatingly disposed in the housing of the charging station so as to be provided with a predefined horizontal movement area within the housing;
a viscous non-conductive and non-magnetic medium of a first density arranged to at least partially fill the housing of the charging station; and
floating bodies and/or hollow bodies of a second density provided in the charging unit, the first density being greater than the second density,
wherein an interaction of the positioning magnet with the localization magnet of the charging module causes an attractive positioning force that horizontally moves the charging unit floatingly disposed in the housing of the charging station.

8. The charging station according to claim 7, wherein the housing is disposed close to or in the ground.

9. A method for charging a vehicle, equipped with a charging module in an underbody thereof, by a stationary charging station equipped with a charging unit for inductively charging a battery of the vehicle, the charging station being disposed close to or in the ground and having a charging unit floatingly disposed in the charging station so as to be movable in a predefined horizontal movement area via an attractive positioning force between a positioning magnet of the charging unit and a localization magnet of the charging module, the method comprising the acts of:

at least partially filing the charging station with a viscous non-conductive and non-magnetic medium of a first density;

providing, in the charging unit, floating bodies and/or hollow bodies of a second density, the first density being greater than the second density;

moving the vehicle into a stopping position in which the charging module is located above the predefined horizontal movement area;

in the stopping position, floatingly moving the charging unit by the attractive positioning force into a charging position relative to the charging module; and when the charging position is reached, inductive energy transfer between a primary coil of the charging unit and a secondary coil of the charging module is locally maximal with respect to a position of the charging unit in the predefined horizontal movement area, wherein charging of a battery of the vehicle occurs.

10. The charging method according to claim 9, further comprising the act of:

minimizing a vertical distance between the primary coil of the charging unit and the secondary coil of the charging module to increase the inductive energy transfer power.

* * * * *